(No Model.)
W. A. GALBRAITH.
CARRIAGE POLE.
No. 422,395. Patented Mar. 4, 1890.
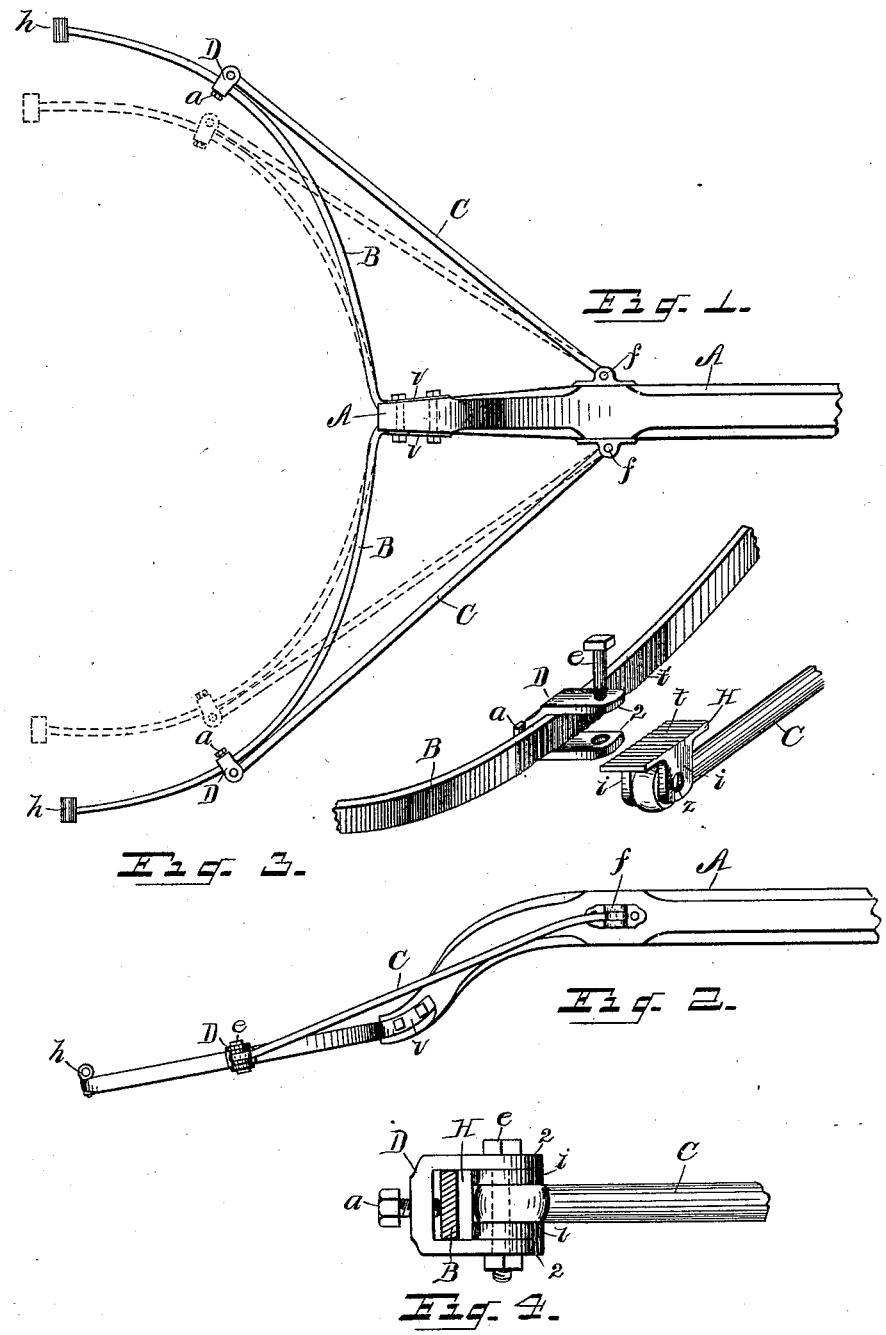
WITNESSES.
INVENTOR
William A. Galbraith
By
Roscoe B. Wheeler
Attorney.

UNITED STATES PATENT OFFICE.

WILLIAM A. GALBRAITH, OF FLINT, MICHIGAN.

CARRIAGE-POLE.

SPECIFICATION forming part of Letters Patent No. 422,395, dated March 4, 1890.

Application filed November 25, 1889. Serial No. 331,563. (No model.)

*To all whom it may concern:*

Be it known that I, WILLIAM A. GALBRAITH, a citizen of the United States, residing at Flint, in the county of Genesee and State of Michigan, have invented certain new and useful Improvements in Carriage-Poles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in adjustable carriage-poles; and it consists in a certain construction and arrangement of parts, whereby the pole may be readily adjusted for a wide or narrow vehicle, all of which will be hereinafter more fully set forth, and the essential features of the device pointed out particularly in the claims.

In the accompanying drawings, forming a part of the specification, Figure 1 is a plan view of a pole embodying my invention. Fig. 2 is a side elevation of the same. Fig. 3 is an enlarged detail showing a portion of the spring-metal circle-iron and its serrated outer face, the rear end of one of the brace-rods, with its toothed head that is adapted to engage the serrated face of the circle-iron, and the clevis and bolt for coupling said parts together. Fig. 4 is a view of said parts coupled together, the circle-iron being in cross-section.

Referring to the letters of reference in the drawings, A represents the pole, B B the spring circle-irons, and C C the brace-rods. The inner ends of the spring circle-irons B B are secured to the rear end of the pole, and on opposite faces, as shown at $v$ in Figs. 1 and 2, said irons curve outward and rearward, and are provided at their rear ends with a swivel-head $h$, having an eye therein, by means of which they are coupled to the clips on the axle of the vehicle.

The forward ends of the brace-rods C C are pivotally coupled to the vertical sides of the pole, as shown at $f$, Figs. 1 and 2. An eye is formed in the rear ends of said brace-rods, that lies between the flanges $i$ $i$ of the head H and registers with the holes $z$ therein. The yoke or clevis D, having the set-screw $a$, receives between its forks 2 the circle-iron and toothed head H, and said toothed head is pivotally coupled therein by means of the bolt $e$, that passes through the forks of the clevis, the hole $z$ in the flanges of the head H, and through the eye in the end of the brace-rod, as clearly shown by dotted lines in Fig. 4. By tightening the set-screw $a$ the serrated face $t'$ of the circle-iron is forced against the toothed surface $t$ of the head H, thus firmly locking said parts.

To adjust the pole for a narrow vehicle, the set-screw $a$ is loosened, which frees the serrated face of the circle-iron from contact with the toothed head H. The free ends of the circle-irons are then sprung in, as shown by dotted lines in Fig. 1, the circle-irons sliding through the clevis D and the brace-rods swinging in. The set-screws $a$ are then tightened, locking the parts, as before stated.

To adjust the pole for a wide vehicle, the set-screws $a$ are loosened and the free ends of the circle-irons sprung out and secured, as before described, which position is shown by solid lines in Fig. 1.

In changing the width of the herein-described pole the circle-irons are adjusted separately and in the same manner, the entire adjustment being accomplished by a manipulation of the fastenings that join the braces to the spring circle-bars, which are herein shown as composed of two parts; but, if desired, the spring circle-bar may be formed in one piece.

It will be seen that the above-described pole is very simple in construction, readily and easily adjusted, and that it is light, cheap, and durable.

Having thus fully set forth my invention, what I claim as new, and desire to secure by Letters Patent, is—

1. In combination with the pole, the spring-metal circle-bar having on the free end an eyed head pivotally attached thereto, the yoke slidingly mounted on the circle-bar and having a set-screw passing therethrough, the brace-rod pivotally coupled to the rear end of said yoke, its forward end being pivoted to the body of the pole, for the purposes set forth.

2. In combination with the pole, the spring-metal circle-bar serrated at *t* and carrying on the free ends the eyed head, the yoke mounted on the circle-bar and carrying a set-screw, the brace pivoted at one end to said yoke, its opposite end being coupled to the pole, the toothed head having a pivotal connection with said yoke and the brace-rod, for the purposes specified.

In testimony whereof I affix my signature in presence of two witnesses.

WILLIAM A. GALBRAITH.

Witnesses:
 JAMES H. MCFARLAN,
 SUMNER HOWARD.